Figure 1:
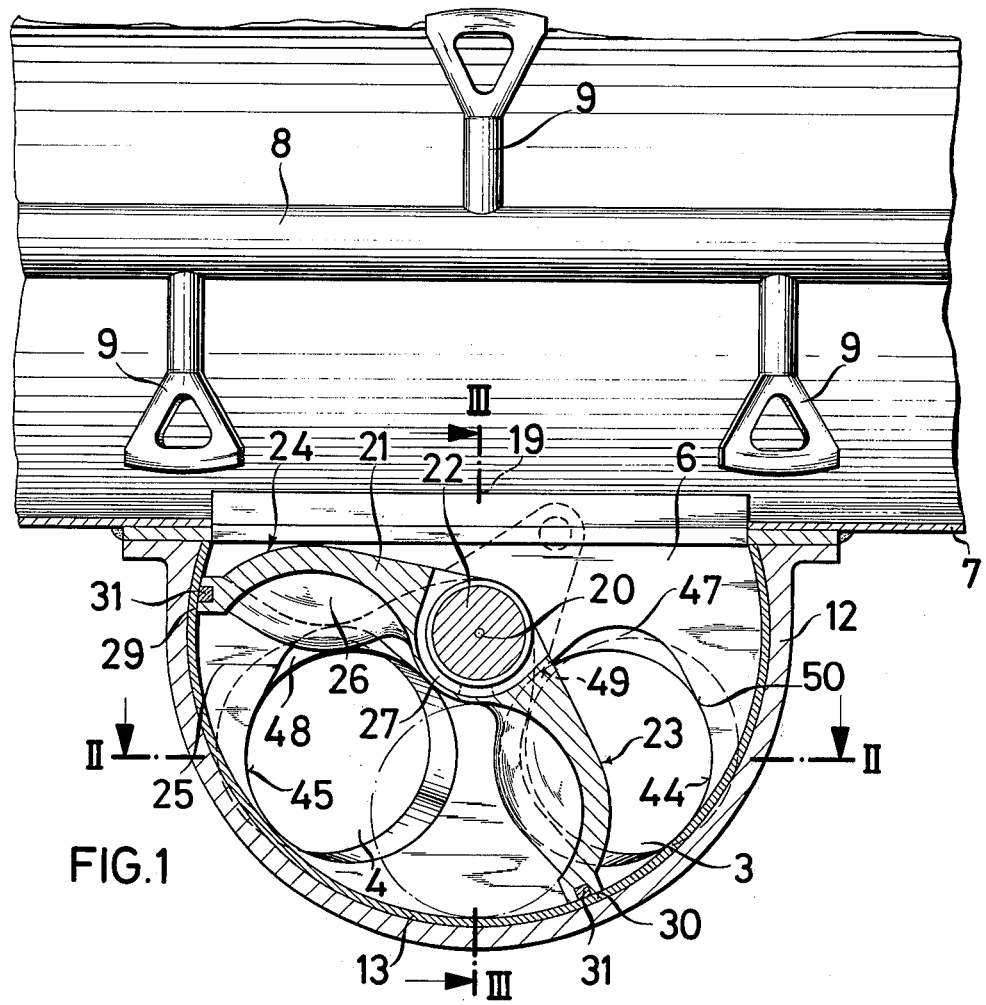

United States Patent [19]

Schwing

[11] 4,057,373

[45] Nov. 8, 1977

[54] MULTI-CYLINDER PUMP FOR CONCRETE

[75] Inventor: Friedrich Schwing, Herne, Germany

[73] Assignee: Friedrich Wilhelm Schwing GmbH, Herne, Germany

[21] Appl. No.: 606,101

[22] Filed: Aug. 20, 1975

[30] Foreign Application Priority Data

Aug. 24, 1974 Germany ............................. 2440654

[51] Int. Cl.² ............................................... F04B 7/00
[52] U.S. Cl. ................................ 417/519; 137/625.21; 137/625.46; 417/900
[58] Field of Search ............... 417/519, 900, 517, 532, 417/430; 137/625.21, 625.46, 330

[56] References Cited

U.S. PATENT DOCUMENTS

| 1,603,837 | 10/1926 | Carson | 137/625.46 X |
| 2,248,449 | 7/1941 | Dudley | 417/519 |
| 3,298,322 | 1/1967 | Sherrod | 417/900 X |
| 3,465,685 | 9/1969 | Sherrod | 417/900 X |
| 3,628,897 | 12/1971 | Stetter | 417/519 |
| 3,829,254 | 8/1974 | Stetter et al. | 417/900 X |

FOREIGN PATENT DOCUMENTS 2,060,289  6/1972  Germany ............................. 417/517

Primary Examiner—William L. Freeh
Assistant Examiner—Edward Look
Attorney, Agent, or Firm—Malcolm W. Fraser

[57] ABSTRACT

In a multi-cylinder pump for conveying concrete, the flow of concrete to and from the cylinders is controlled by a pivot body containing a pressure channel. The pressure channel is bounded by blades, each of which has a blade plate shaped in accordance with the flow of material and sealed to the pump casing wall at its edges. Each blade also has a base whereby it is attached to the pivot body shaft.

10 Claims, 15 Drawing Figures

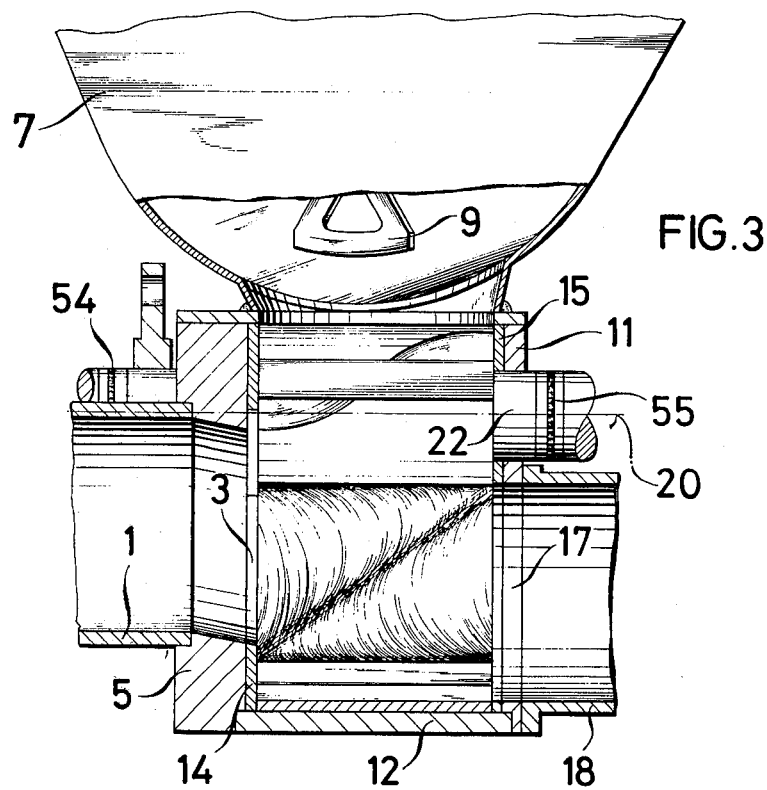
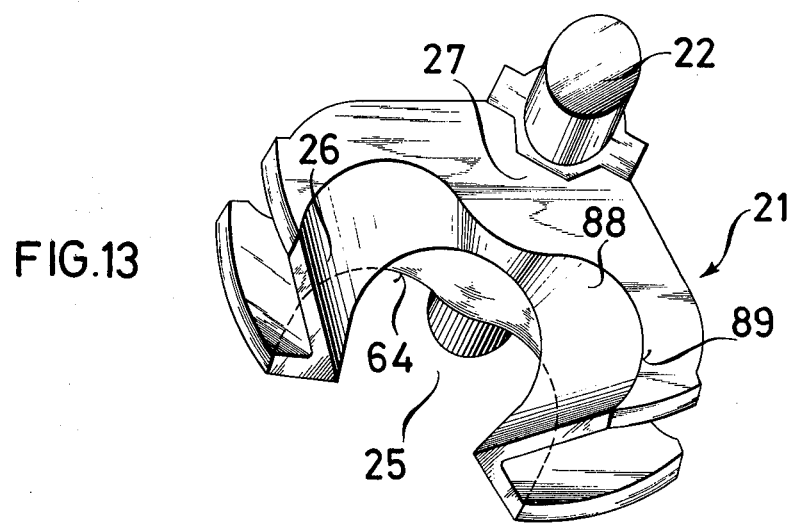

MULTI-CYLINDER PUMP FOR CONCRETE

This invention relates to multi-cylinder piston pumps for conveying concrete of the type in which the cylinders each alternately suck the conveyed material out of a filling chamber through a respective inlet opening and force the material conveyed through an outlet opening. The inlet openings are located in an end wall of the filling chamber casing at approximately equal distances from a vertical plane extending through the casing and containing a horizontal axis which is the axis of the cylindrical wall of the casing. The outlet opening is located in the other end wall and also situated in said vertical plane so that the perpendicular projection of the outlet opening on to the inlet openings partially covers the inlet openings. A pivot body fixed on a shaft containing said horizontal axis acts to deflect the conveyed material in the filling chamber, the pivot body enclosing a pressure channel tapering outwardly towards the outlet opening.

In this type of multi-cylinder piston pump the filling chamber and the pivot body form a four-way valve. By means of the latter the cylinders are connected individually and alternately to a preliminary feed receptacle accommodating the concrete and to the output pressure pipe. In order to ensure high output transportation of concrete, on the one hand the deflections of the conveyed material which occur in the different paths of the control body must be as few as possible while on the other hand the forces of movement arising in the pivot body must be kept low.

A multi-cylinder piston pump with the features described above is known (DBP No. 1,278,247). In this multi-cylinder piston pump the pivot body has a well running parallel to the casing sleeve and contains the pressure channel running in an S-shape at the two inlet openings so that a spectacle-shaped recess is formed on the side of the pivot body facing the one casing end wall. The advantage of this formation of the pivot body is that the cylinders can suck the material conveyed out of the preliminary feed receptacle through an approximately 90° deflection only and that the material conveyed during the compression stroke need only be deflected by approximately 20° to 25° in order to reach the discharge opening. As a result, the flow resistances are relatively low.

However, considerable friction resistances occur particularly above all at the cylindrical wall surface due to the fine concrete aggregates. They are even higher with greater rates of transportation and, despite application of considerable torque to the shaft, can lead to jamming of the pivot body. These difficulties are magnified due to the relatively large mass of the pivot body which has to be moved during each control operation.

There are also multi-cylinder piston pumps known with so-called rotary flap valves. One of these pumps (DBP No. 1,945,483) uses a two-winged rotary flap, the wings of which are located at an angle to one another. If the shaft is arranged perpendicular, then one or other of the wings lies perpendicular to the conveying cylinder in each final position of the rotary flap. Since with this arrangement of the shaft, the preliminary feed receptacle must be located substantially between the two limbs of the Y-pipe filling chamber casing, the material conveyed is subject to considerable deflection angles when it flows into the cylinder which is sucking. Moreover, large amounts of concrete settle in front of one of the rotating wings in the filling chamber casing during the compression stroke.

If the shaft is arranged horizontally, the suction paths are more favourable but the deflections of the material conveyed on compression are then restrictive because the perpendicular projection of the outlet opening on to the filling chamber end wall opposite must lie far outside and below the inlet openings in order to keep the conveying paths free of restrictions. In fact the friction ratios and the inert mass of the rotary flaps are more favourable than those of the previously described pivot body. The flow resistances caused by the unfavourable formation of the conveying paths and the difficulties caused by the relatively large axial construction length in a horizontal shaft lead to considerable disadvantages in operation and in construction of the pumps, especially if these are to be housed on vehicles.

An object of the invention is to reduce the friction resistances previously arising in the filling chamber while retaining the advantages shown of the multi-cylinder piston pumps described at the beginning and to reduce the inert mass of the pivot body.

According to the invention, there is provided a multi-cylinder piston pump for conveying concrete, the cylinders of which each alternatively suck the material conveyed from a filling chamber through a respective inlet opening and force the material conveyed through an outlet opening, said inlet openings being located in an end wall of the filling chamber casing at approximately equal distances from a vertical plane through the casing, said plane containing a horizontal axis to which the cylindrical wall of the casing is concentric, said outlet opening being located in the other end wall and also situated in said vertical plane, the perpendicular projection of the outlet opening on to the inlet openings partially covering said inlet openings, a pivot body fixed on a shaft containing said horizontal axis acting to deflect the material conveyed in the filling chamber, the pivot body enclosing a pressure channel leading to the outlet opening, the pressure channel being bounded by blades each of which has a blade plate which is shaped according to the stream of material to be conveyed and has its edges sealed against the casing walls, and a base which is fixed to the shaft.

In this pump, as a result of their position the inner surfaces of the two blade plates enclose the pressure channel and direct the material conveyed under pressure into the outlet opening, and their outer surfaces direct the material out of the preliminary feed receptacle into the cylinder which is sucking. Due to the low wall strengths possible in blade plates of this type, the widths of the edges of the blade plates which sealing against filling chamber casing walls, are reduced so that the friction is lowered accordingly and blockages of the pivot body are prevented. At the same time, the inert mass of the pivot body is diminished accordingly.

On the other hand, the invention causes the degree of deflection of the material, conveyed under the respective compression, to be sharply reduced in relation compared with that occuring in a pump having rotary flaps and a horizontally arranged shaft. The advantages of this are not only the achievement of a decisive improvement in the flow conditions but also a corresponding reduction in the height of the filling chamber casing. Since in such a filling chamber casing, which is also smaller overall, there is less of the material to be conveyed, a reduction of the mass of material to be moved when changing direction is achieved as compared to the previous rotary flap constructions.

While the blade plates may be flat, or curved only on one side, because besides covering the inlet opening associated with the respective cylinder when it is sucking, only the widening of the pressure channel has to be ensured, the use of blade plates with more complex curved shapes gives additional advantages. In this way, predetermined design quantities of material conveyed will remain in the pressure channel in the region of the blade plate edges forming a seal with the casing sleeve and then contribute to the seal.

Preferably the curved shape of the blade plates is so arranged that the blade plate end edges confronting the filling chamber end wall which contains the outlet opening, are curved convexly from the pressure channel and that the opposite end edges of the blades plates are concavely curved. These curves of the end edges of the blade plates should, according to another feature of the invention, correspond at least partially to the curves of the rims of their associated openings.

The curved shaping of the blade plates may extend over the entire width of each blade plate and so as to provide a helical shape for the blade plate end edges forming a seal with the casing sleeve. On the other hand, it may be advisable to make the blade edges facing the casing sleeve straight so as to be able to use straight packing strips for building into the blade edges.

In all embodiments of the invention the most favorable flow conditions are achieved if a continuous transition of the convex blade plate sections into the concave blade plate sections is provided. However, it is also possible to provide the transition of the concave blade plate sections into the convex ones as a step instead of a constant curve.

By means of additional measures the resistances which the material conveyed raises against the pivot movement of the blades, may be diminished still further. According to a feature of the invention there are recesses in the rims of the edges of the inlet openings of the filling chamber casing, which are formed so as to have the shape of a crescent in the plane of the casing end wall. In particular, one tip of one recess respectively is arranged in the casing end wall quite near the shaft, and the other tip of the crescent is offset therefrom by approximately a quadrant or less. In fact it is inevitable that parts of the rough aggregate material will be broken from the edges of the blade plates, but jamming of the broken pieces is avoided by the said measures. Indeed, if a stone contained in the concrete is broken, then its broken pieces cannot pass between the end edge of the blade plate and the casing wall but reach the relevant recess where they cannot do any damage.

It is also recommended, according to another feature of the invention, to provide the blade bases with grooves in their edges facing the end walls of the filling chamber casing, the grooves being arranged concentric to the shaft. As a result, it is indeed possible to achieve a gradual decrease in the pressure operating in the pressure channel towards the shaft at a permitted point for function of the control and therewith to diminish the axial load on the shaft. It is also recommended to provide strippers which are located on the end walls of the filling chamber casing and protrude into the grooves of the blade bases. These strippers keep the grooves clean so that they cannot become blocked.

The walls of the casing often have a relatively large wall strength, which should be taken into account in the formation of the flow paths. In order to decrease the degree of deflection of the material conveyed, the outlet opening may be formed conically.

Figure 2:
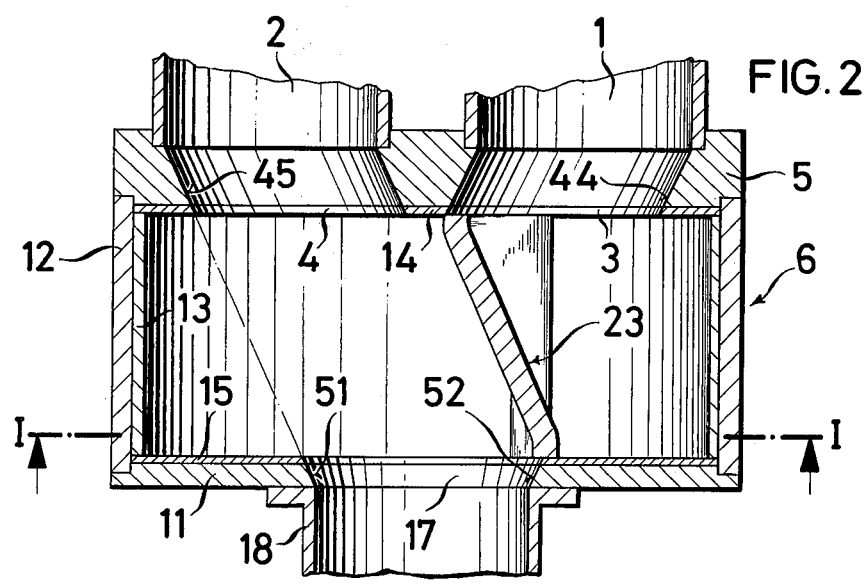
Figure 4:
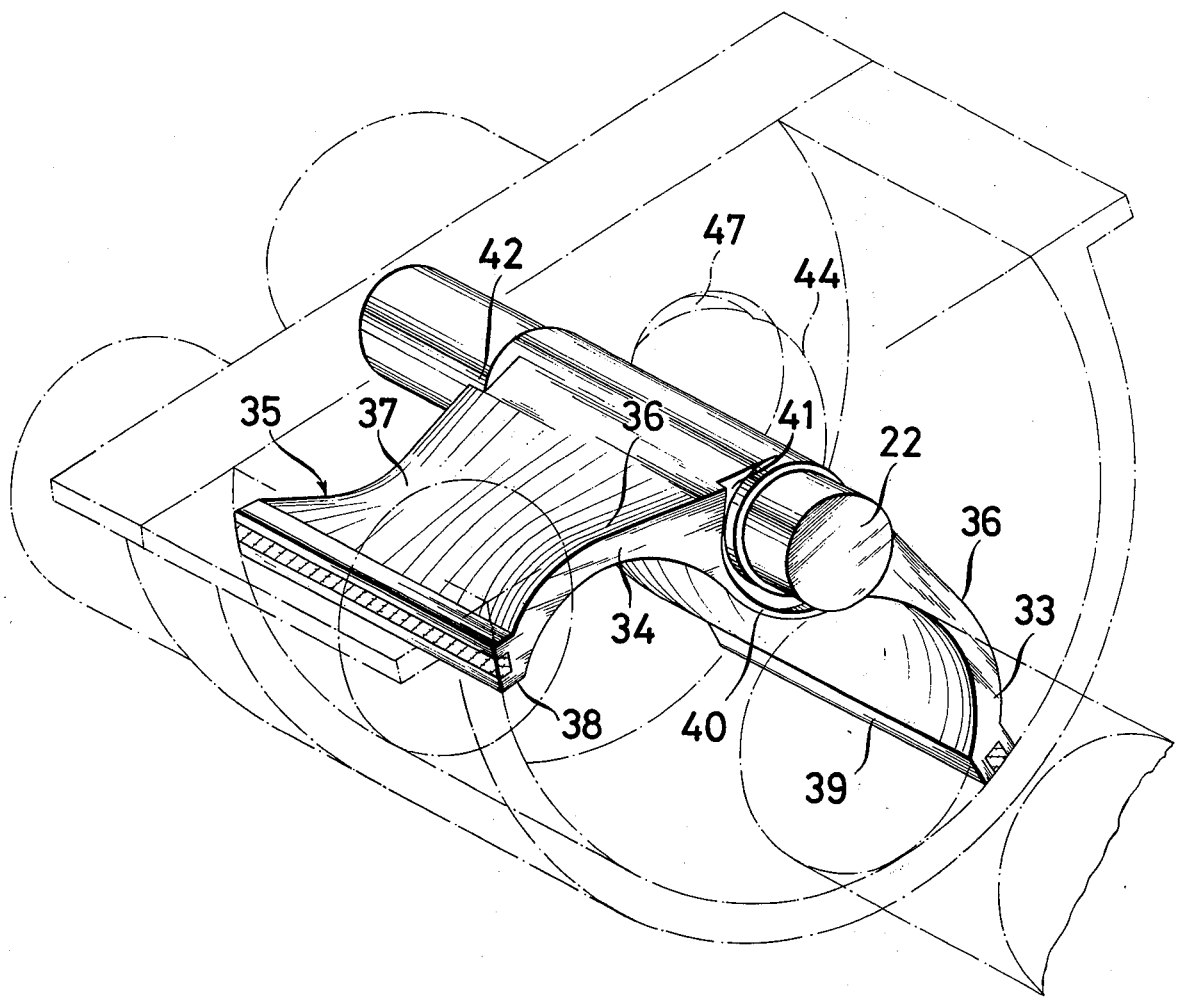
Figure 5:
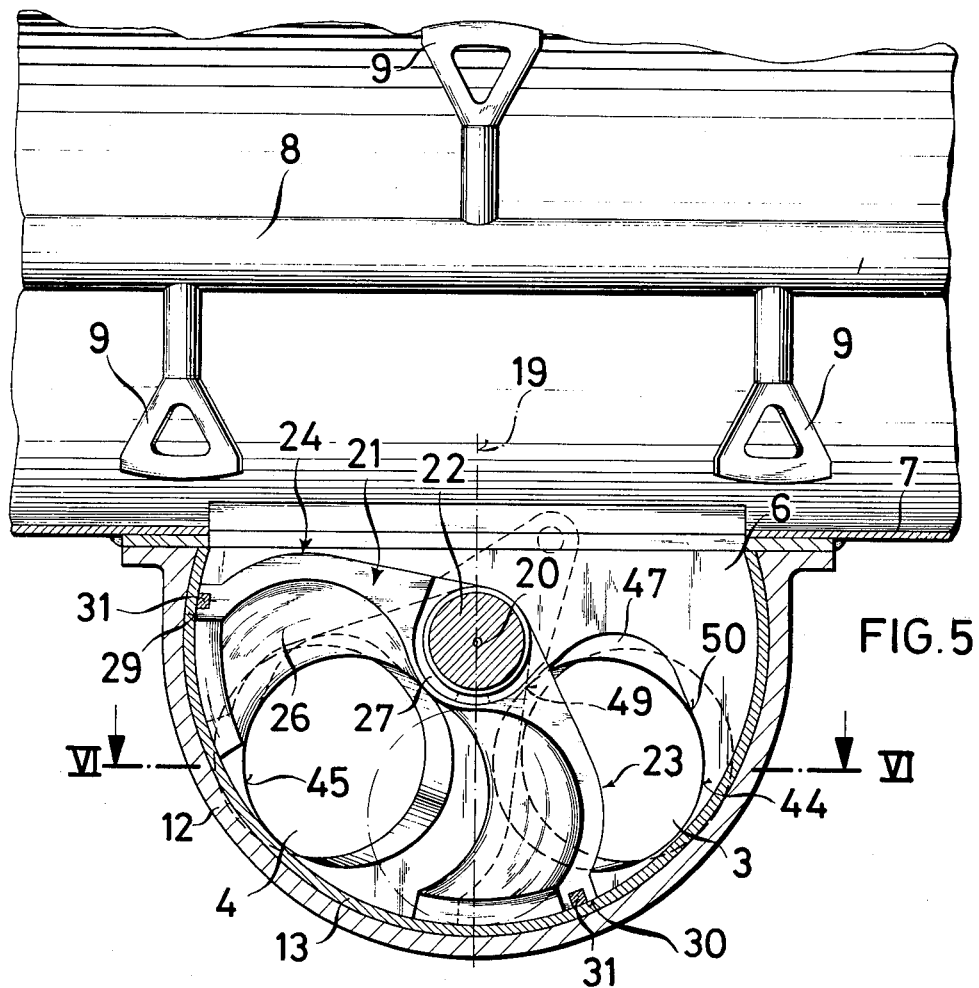
Figure 6:
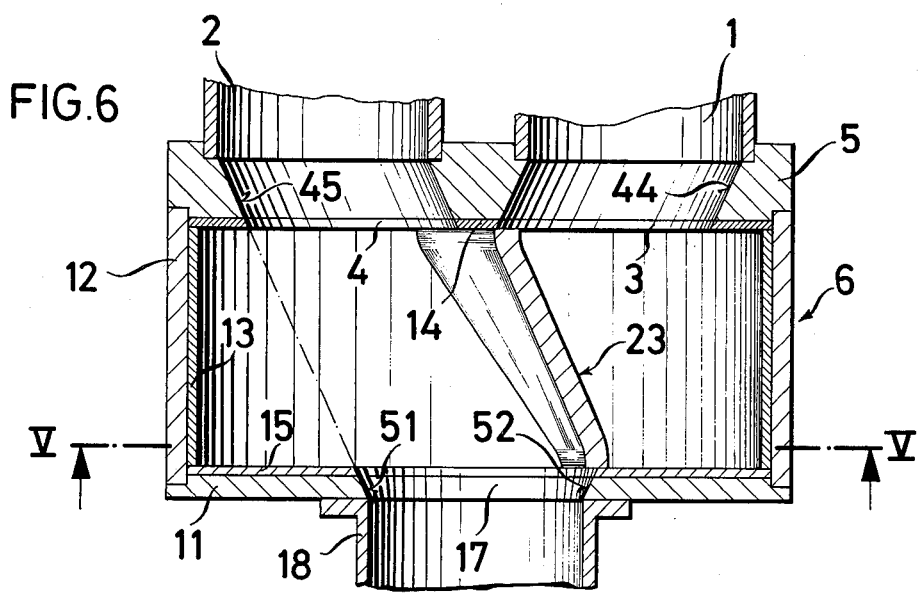
Figure 7:
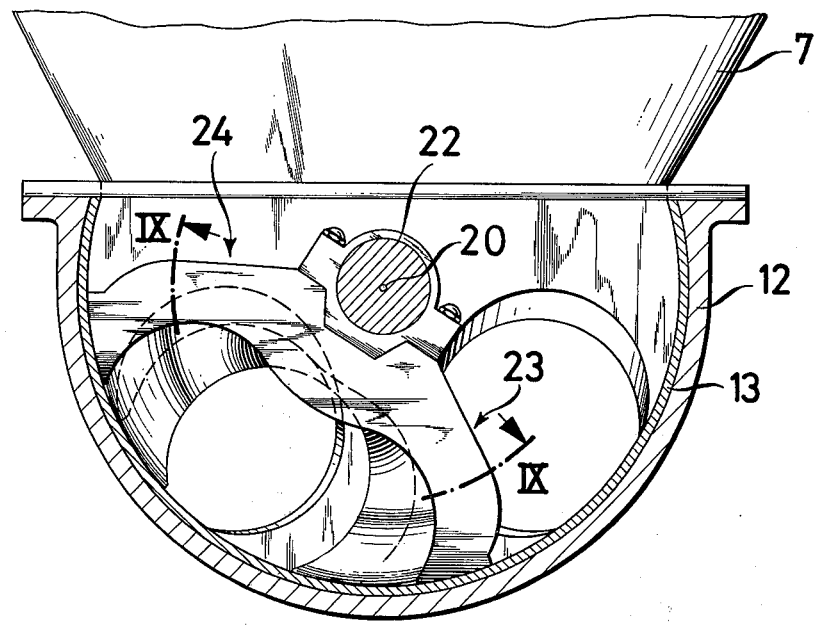
Figure 8:
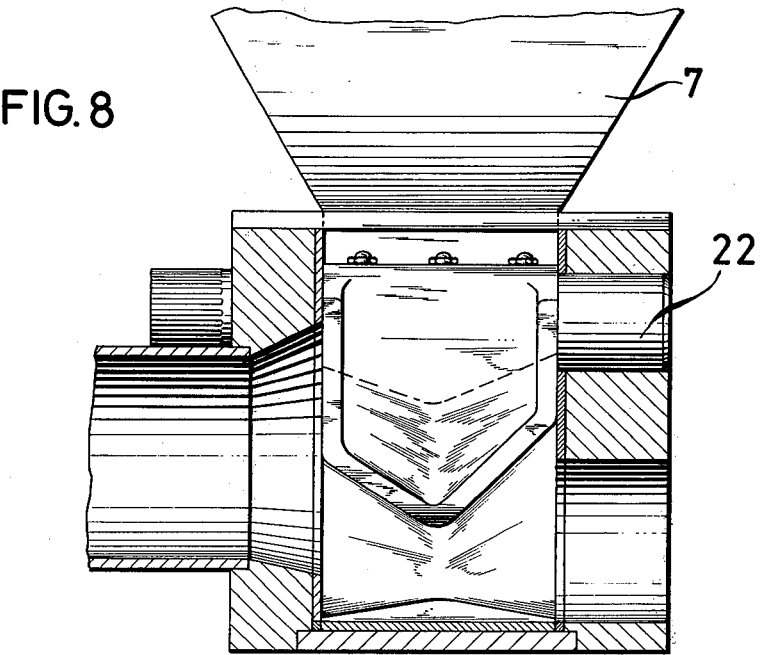
Figure 9:
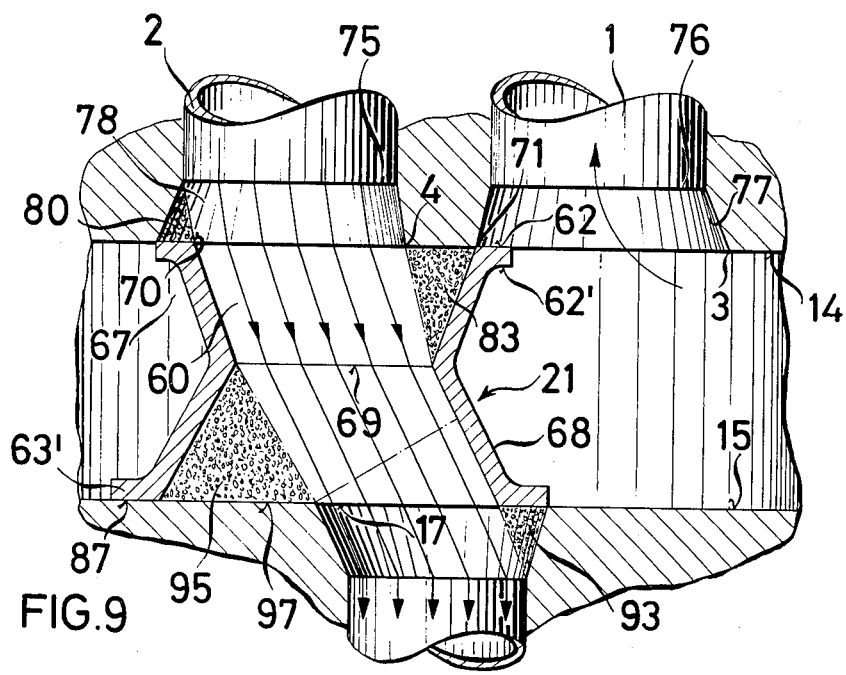
Figure 10:
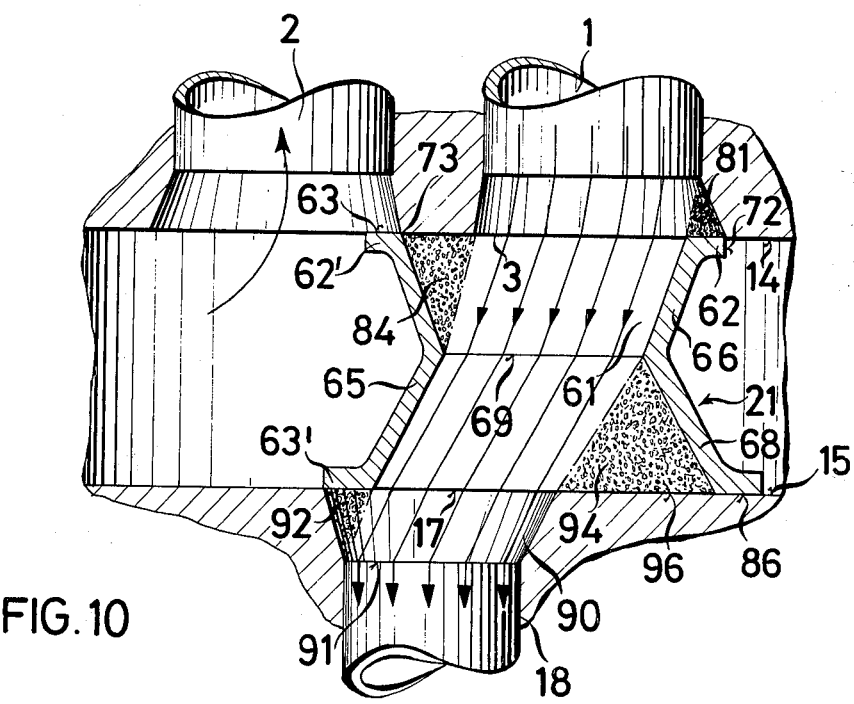
Figure 11:
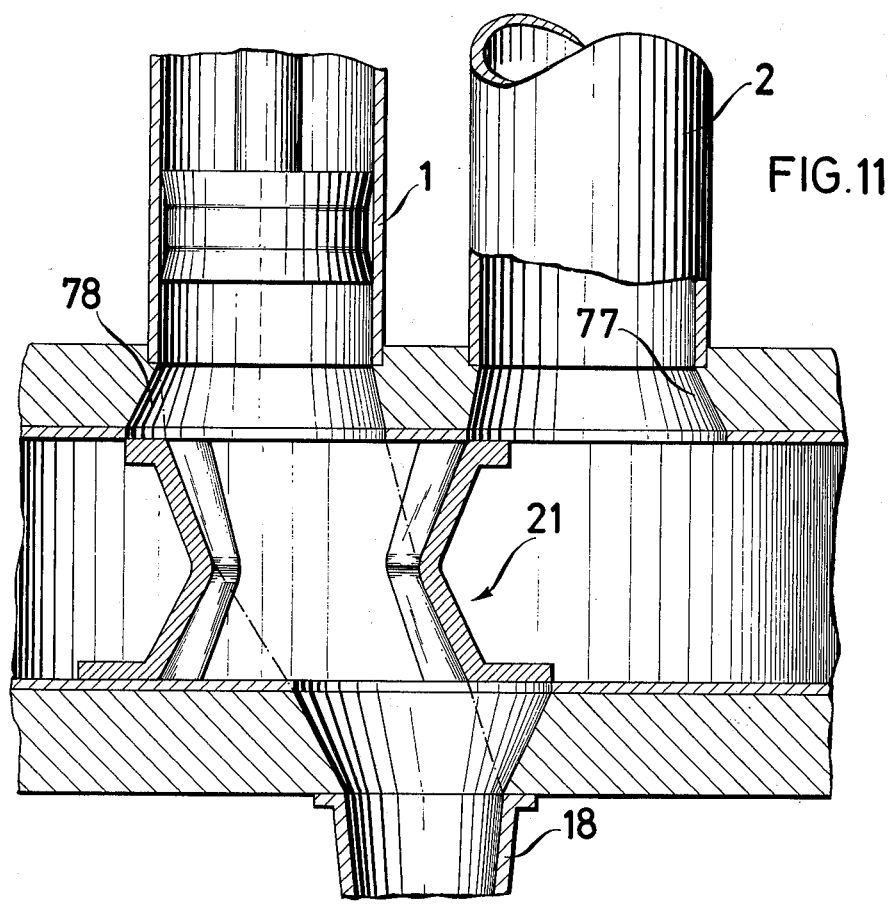
Figure 12:
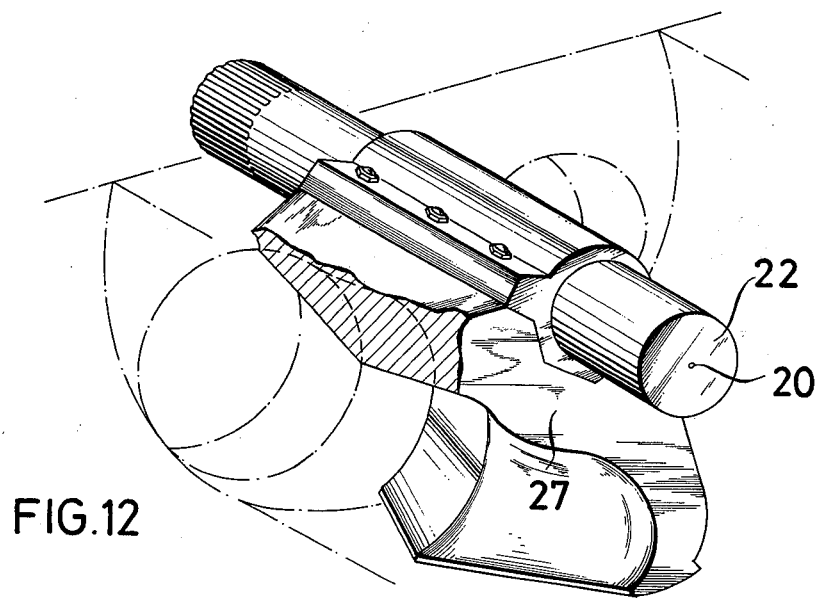
Figure 14:
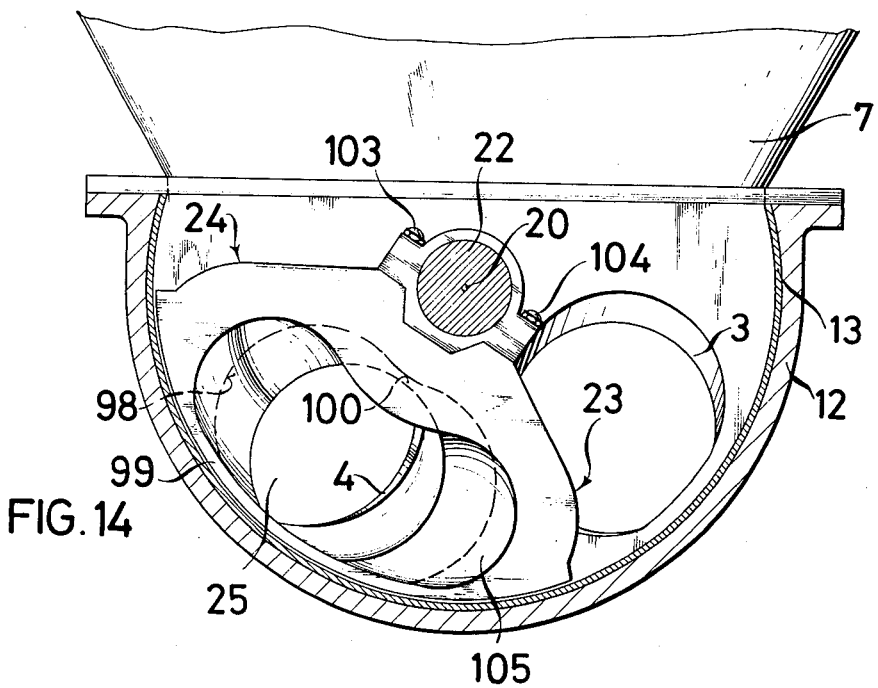
Figure 15:
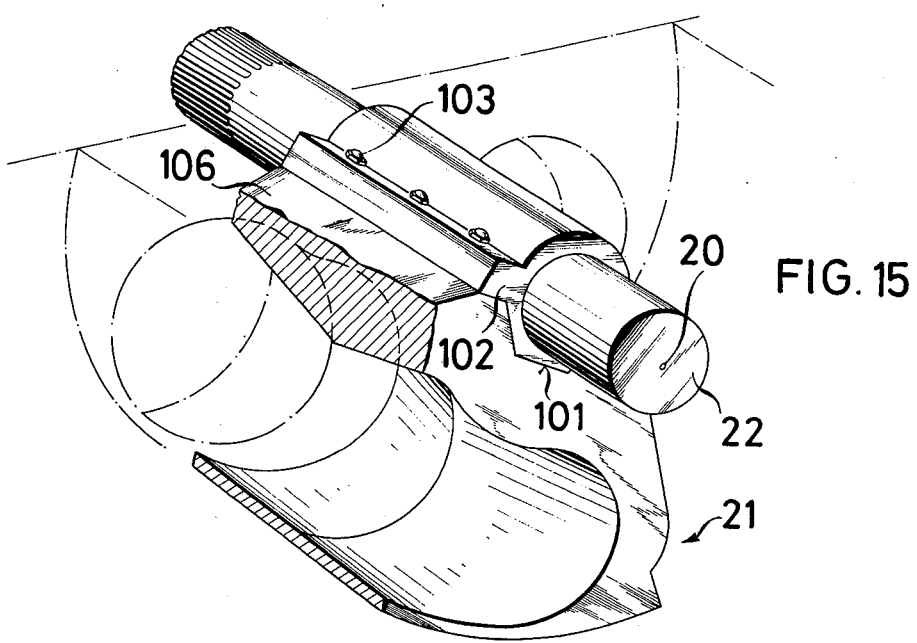

Further features and advantages of the invention are given in the following description of several embodiments with reference to the accompanying drawings, in which:

FIG. 1 is a sectional view, taken along the line I—I in FIG. 2, of a multi-cylinder pump in accordance with the invention, showing the preliminary feed receptacle and the members beneath the latter, FIG. 2 is a sectional view taken along the line II—II of FIG. 1, FIG. 3 is a sectional view taken along the line III—III of FIG. 1, FIG. 4 is a perspective view of part of the pump shown in FIGS. 1, 2 and 3, FIGS. 5 and 6 show a modified embodiment of the invention in sectional views corresponding to FIGS. 1 and 2 respectively, FIG. 7 is a sectional view corresponding to FIG. 1 of a modified embodiment of the invention, FIG. 8 is a sectional view corresponding to FIG. 3 of the embodiment according to FIG. 7, FIG. 9 is a schematic sectional view taken along the line IX—IX of FIG. 7, excluding all details not necessary for the understanding of the invention, FIG. 10 is a sectional view corresponding to FIG. 9, showing the pivot body in another position, FIG. 11 is a schematic representation of the pivot body in a view corresponding to FIG. 9, FIG. 12 is a perspective view of the pivot body in the position shown in FIG. 11, FIG. 13 is a perspective view of an embodiment of the pivot body, FIG. 14 shows a further embodiment of the pivot body in a sectional view corresponding to FIG. 7, and FIG. 15 is a broken away perspective view of the pivot body according to FIG. 14.

The concrete pump shown in FIGS. 1 to 4 has two conveying cylinders 1 and 2 to which are assigned respective openings 3 to 4 in an end wall 5 of a filling chamber 6. The pistons (not shown) housed in the cylinders 1 and 2, suck concrete out of a preliminary feed receptacle 7. The concrete in the cylinders 1 and 2 is under hydrostatic pressure due to the level of the concrete in the preliminary feed receptacle 7. Moreover, the preliminary feed receptacle 7 is provided with a shaft 8 with paddles 9 for stirring the concrete contained therein. The concrete runs from the preliminary feed receptacle 7 through the opening 3 or 4 respectively into the cylinder which is sucking.

The casing of the filling chamber 6 also has an end wall 11, running parallel to the end wall 5, and a cylindrical casing 12. The inside of the casing is furnished with wear plates 13 to 16. In the end wall 11 and naturally also in its wear plate 15 there is an outlet opening 17, through which the material conveyed under compression is delivered to a discharge pipe 18. The filling chamber is crossed by a vertical plane 19 which is indicated by the line of the section III—III in FIG. 1. In the end wall 5 of the casing, the inlet openings 3 and 4 lie at approximately equal distances from the vertical plane 19. The vertical plane 19 also contains an axis 20 to which the cylindrical wall 12 of the casing is concentric. The outlet opening 17 in the other end wall 11 of the casing is also located in the vertical plane 19. The perpendicular projection of this opening on to the inlet openings 3 and 4 covers them partially as can be seen in FIGS. 1 and 2.

A pivot body 21 serves to deflect the material conveyed in the filling chamber. It is fixed on to a shaft 22 which is coaxial with the axis 20. The pivot body comprises two blades 23 and 24. These two blades 23 and 24 bound a pressure channel 25 (visible in FIGS. 1 and 2) which widens towards the outlet opening 17.

Each blade has a blade plate 26 shaped to conduct the stream of material conveyed out of the preliminary feed receptacle 7 into the inlet opening 3 or 4 or out of the cylinders 1 or 2 into the outlet opening 17. An integral base 27 is common to both blade plates 23 and 24. The longitudinal edges of the blade plates 23 and 24, which are identical, run straight and parallel to the shaft 22 according to the embodiments shown in FIGS. 1 to 6. Recesses for packing strips 31 are located in the end surfaces 29 and 30 of the blade plates 23 and 24. Moreover, the end edges 33 or 34 of the blades seal against the wear plate 51 of the end wall 11 of the casing 6. Corresponding seals are located on the end sides 35 of the blade plates opposite the wear plate 14 of the end wall 5 of the casing 6.

As can be seen from FIGS. 1 and 4 the blade plate edges 33 and 34, which confront the end wall 11 housing the outlet opening 17, are curved convexly at 36 while the opposite end edges 35 of the blade plates are each formed as a concavely curved blade plate number 37. As shown in FIG. 4, the convexly curved blade plate members 36 merge continuously into the concavely curved members 37.

The curves of the end edges 35 conform at least partially to the curves of the rims of the corresponding openings 3 and 4 while the curves of the end edges 33 and 34 conform at least partially to the curve of the rim of the opening 17.

FIG. 4 shows, moreover, that the blade edges 38 and 39 confronting the casing sleeve run straight and are parallel to the shaft 22. The end edges 40 common to both blade bases 27 can be seen in FIG. 4. They bear grooves 41 and 42 which run concentric to the shaft 22. Their function was explained at the beginning of this specification. Strippers (not shown) fixed to the end walls 11 or 15 and 5 or 14 and project into the grooves 41 and 42 in order to clear them of material which becomes lodged therein.

There are recesses in the rims 44 and 45 of the inlet openings 3 and 4 respectively of the filling chamber casing 6, one of which is shown at 47 in FIG. 4. The other recess is visible at 48 in FIG. 1. The recesses 47 and 48 are crescent-shaped as viewed in the plane of the casing end wall. A tip 49 of each of the recesses 47 and 48 in the casing end wall 14 or 5 is thus located near the shaft 22. The other crescent tip 50 is located in a position offset in relation to the crescent tip 49 by approximately a quadrant.

FIG. 2 shows that the outlet opening 17 widens conically into the inside of the casing 6. The widening is arranged so that the parts 51 and 52 associated with the openings 34 respectively are in alignment with the path of the edges of contact 44 or 45.

The shaft 22 is supported in thrust bearings 54 and 55 (FIG. 3), which accommodate axial forces transmitted by the blade plates.

The embodiment according to FIGS. 5 and 6 is distinguished from that according to FIGS. 1 and 2 essentially by the fact that the modified blade plates 23 and 24 are curved in one plane only.

Although in the drawings the casing sleeve is concentric with a substantially horizontal axis, this axis can also be arranged in a different position relative to the horizontal, for example, when bends are attached to the cylinders and the casing is connected to the bends.

In contrast to the embodiments shown in FIGS. 1 to 6, the pivot body 21 in the embodiments of the invention shown in FIGS. 7 to 15 is formed with the aim of sweeping the entire flow volume of the pressure channel 25 with the concrete forced from the cylinders 1 and 2 at least on alternate compression strokes of the piston pump. As a result, the concrete not removed by one piston compression is conducted away at the following piston compression. Thus the gradual obstruction and clogging of the pressure channel is avoided and a lower flow resistance is achieved.

Common to these embodiments is the fact that the shape of the pressure channel, as can be seen particularly from the schematic view of FIGS. 9 and 10, corresponds to two intersecting pipe segments. The flow lines in these pipe segments are shown schematically by arrows. As can be seen each pipe segment is assigned to a respective one of the two cylinders 1 and 2. The arrangement is such that the pipe segment 60 connects the inlet opening 4 associated with the expressing cylinder 2 in FIG. 9 to the outlet opening 17, while as shown in FIG. 10, the pipe segment 61 connects the inlet opening 3 associated with the cylinder 1 which is compressing to the outlet opening 17. FIGS. 9 and 10 thus show the two possible operating positions of the pivot body 21.

In each of these pivot positions the end surfaces 62 and 63 associated with the cylinders 1 and 2 encircle the free flow area, i.e., are not restricted by parts of the pivot body, which is shown for example in FIG. 13 by means of partially dashed representation of its outline 64. It can be seen therefrom that the expression pipe segment in the illustrated embodiment means that only a segment of the cylindrical wall of the imaginary pipe is present. Thus the pipe segment 61 is without a continuous cylindrical wall. Of the remaining cylindrical wall only the section 65 on the one side and a section 66 on the opposite side is present. Also, the corresponding cylindrical wall segment is missing from the imaginary pipe segment 60 and only segments 67 and 68 are present. Those sections which are present reach as far as a plane 69 which runs parallel to the filling chamber end walls 14 and 15 containing the openings 3 and 4 and the opening 17 respectively. Moreover, the plane 69 is offset towards the filling chamber end wall 14 containing the inlet openings 3 and 4 and from the centre, so that the sections 66 and 67 of the pipe segments 60 and 61 are shorter axially than the attached sections 65 and 68 of the pipe segments.

In FIG. 9 the end surfaces 62 and 63 of the pivot body are formed on a flange 62'. Corresponding thereto is a flange 63' on the opposite end of the pivot body. The outer contact edge of the flange 62' is in alignment with the outer contact edge of the inlet opening 4, which is associated with the cylinder 2 (shown compressing) and runs across the inner contact edge of the other inlet opening 3 as far that the inner contact edge of the flange 62' is in alignment with the inner contact edge of the inlet opening 3 of the cylinder 1 (shown sucking).

Indeed the areas of cross-section of the inlet openings 3 and 4 are larger than the areas of cross-sections of the cylinders 1 and 2 located at 75 and 76 because the opening 3 and 4 are formed on the ends of channels 77 and 78 associated with the filling chamber end wall 14. These channels 77 and 78 widen conically from their respective cylinders 1 and 2 into the filling chamber.

The construction described results in the formation of areas which are swept through only on alternate compression strokes of the concrete pump. Two of these areas lie behind the filling chamber end wall 14 outside in the channels 77 and 78 respectively and are designated 80 and 81. Two further areas lie in front of the end wall 14 and respectively behind the sections 66 or 67 of the pipe segments 60, 61 described above. These areas are designated 83 and 84 and lie between the two inlet openings 3 and 4 and thus between the cylinders.

As the flow lines show, concrete remains in the areas 80 and 81 or 83 and 84 during one piston compression. These amounts of concrete lead to a seal which prevents water from coming out of the cement mix. Since the relevant amounts are removed at the following piston compression, because the areas containing them are then flowed through by the material conveyed, clogging cannot occur. There are areas adjacent to the chamber end wall 15 corresponding to the areas 80, 81 and 83, 84 adjacent to the end wall 14 as will now be described.

The blade plate end surfaces 86 and 87 associated with the outlet opening 17 encircle a free flow area 88 (FIG. 13), the outline of which is shown at 89. This area 88 is larger than the area of the outlet opening in each of the two pivot positions, shown in FIGS. 9 and 10, of the pivot body 21. Thus the pivot body 21 covers a portion of the filling chamber end wall 15 respectively, which at least partially contains the perpendicular projection of the inlet opening 3 or 4 of the cylinder 2 (FIG. 9) or 1 (FIG. 10) and the outlet opening 17.

In the filling chamber end wall 15 a channel 90, which widens conically from the area shown as 91 of the discharge pipe 18 towards the filling chamber, is located behind the outlet opening 17.

The construction described results in the formation of areas in the region of the end wall 15 through only on alternate compression strokes of the pump. Two of these areas lie behind the end wall 15 outside on the channel 90 and are designated 92 (FIG. 10) and 93 (FIG. 9). Two further areas lie in front of the end wall 15 and respectively behind the sections 65 and 68 of the pipe segments 60 and 61. These areas are designated 94 (FIG. 10) and 95 (FIG. 9). They lie, moreover, in front of the segment 96 (FIG. 10), 97 (FIG. 9) in the end wall 15 covered by the free area 89 of the pivot body 21.

The embodiment according to FIGS. 14 and 15 is distinguished from the embodiment according to FIG. 7 to 12 by the fact that the shape of the pressure channel 25 is made by two pipes crossing in the filling chamber and not by pipe segments. One of the pipes which is designated 105 is associated with the cylinder 2 and connects the inlet opening 4 assigned to this cylinder to outlet opening, while the other pipe 98 is associated with the cylinder 1 and its inlet opening 3 connects to the outlet opening. The two blades 23 and 24 forming the pivot body encircle the pressure channel 25 on all sides. The wall 99 of the pressure channel 25 lies in the region of the casing sleeve 12. It has a substantially constant thickness.

The pipe segments affected in the embodiment according to FIGS. 7 to 13 and the pipes in the embodiment according to FIGS. 14 and 15 respectively intersect in the plane designated 69.

In both embodiments the blades 23 and 24 are formed as one piece by the connection of their bases at 100. The two blades formed together as one piece are detachably connected to the pivot shaft 20. For this purpose the pivot body has a prismatic recess 101. It acts to accommodate a prismatic member 102 connected to the pivot shaft. The pivot body 21 and the member 102 are connected together by several screws 103, 104, which are arranged on both sides of the pivot shaft 20. By releasing the screws the pivot body 21 can thus be removed and if necessary exchanged.

The concrete pours out of the hopper 7 into the induction cylinder over the outer side 106 of the pivot body 21 into the inlet opening 3 or 4. The shape of the contact surface of the pressure channel 25 corresponds substantially to the shape of the outer side of the pivot body is evident from FIG. 13. Here, the pivot body 21 has substantially equal wall thickness overall.

The embodiments according to FIGS. 7 to 15 have the common advantage that there are short pivot paths as a result of the shape of the pivot body 21. Therefore short change-over times are obtainable. Since the hopper 7 is located immediately above the pivot body 21, the arrangement of a special stirring apparatus 8, 9 is superfluous in these embodiments because the pivot movements of the pivot body cause an adequate movement of the solid concrete.

The described shape of the pivot body 21 has, moreover, the result of eliminating additional loads due to torque. This is because the pivot body 21 is symmetrical in all directions in which the concrete exercises pressure.

The presence of areas 80,81; 83,84; 92,93 and 94,95 moreover, have the result that aggregate present in the concrete does not become broken up but is forced away into these areas. As a result, a weaker drive can be used, since only friction resistances have to be overcome.

I claim:

1. A multi-cylinder piston pump for conveying concrete, comprising two cylinders, a filling chamber casing, a respective inlet opening for each cylinder located in an end wall of the filling chamber casing at approximately equal distances from a vertical plane through the casing, said plane containing a horizontal axis which is the axis of the cylindrical wall of the casing, an outlet opening located in the other end wall, the perpendicular projection of the outlet opening on to the inlet openings partially covering said inlet openings, each cylinder being arranged to alternately suck the material through its respective inlet opening and force the material conveyed through the outlet opening, said pump further comprising a shaft containing said horizontal axis, a pivot body fixed on said shaft acting to deflect the material conveyed in the filling chamber, blades on said pivot body enclosing a pressure channel leading to the outlet opening, each blade having its edges sealed against the casing walls, and a base which is fixed to the shaft, the shape of said pressure channel being formed by the intersection of two pipe segments with the portions of the pipe segments which lie within the channel being eliminated, the line of said intersection being located substantially midway between the two end walls of the filling chamber, complementary surfaces on said pipe segments providing a smooth flow path when said pivot body is in one position only, and conical recesses on said inlet and outlet openings providing a smooth flow from said pressure channel to said openings.

2. A multi-cylinder piston pump according to claim 1, wherein the blade edges confronting the cylindrical wall of the casing sleeve are helically curved according to the torsion of the blade plates.

3. A multi-cylinder piston pump according to claim 1, wherein the end surfaces of the blade plate facing the cylinders encircle a pressure channel area where the fluid is stationary in each pivot position of the pivot body, the area extending from the outer boundary of the inlet opening facing the cylinder which is compressing to the inner boundary of the inlet opening associated with the cylinder which is sucking.

4. A multi-cylinder piston pump according to claim 1, wherein the end surfaces of the blade plate associated with the outlet opening encircle a pressure channel area where the fluid is stationary in each of the two pivot positions of the pivot body, the area being larger than the area of the outlet opening, whereby the pivot body covers a portion of the filling chamber end wall which contains the outlet opening, said portion of end wall at least partially containing the perpendicular projection of the inlet openings of the cylinder which is compressing and the outlet opening said outlet opening being of frustoconical form with the larger end adjacent the filling chamber.

5. A multi-cylinder piston pump according to claim 1, wherein the inlet openings and the outlet opening comprise the ends of channels associated with the filling chamber end walls, the channels widening conically starting from the area of the respective cylinder or the pressure pipe associated with them.

6. A multi-cylinder piston pump according to claim 1, wherein the narrowest area of the pressure channel in the pivot body lies in a plane running parallel to the filling chamber end walls which contain the inlet and outlet openings, respectively, the plane being offset from the centre of the filling chamber towards the end wall of the filling chamber which contains the inlet openings whereby the sections of the pipe segments adjacent the inlet openings are shorter than the other pipe segments.

7. A multi-cylinder piston pump according to claim 1, wherein the pivot body has a prismatic recess in addition to the pressure channel for accommodating a prismatic follower connected to the pivot shaft.

8. A multi-cylinder piston pump according to claim 1, wherein the blades encircle the pressure channel on all sides and the wall of the pressure channel in the region of the cylindrical wall of the casing has a substantially constant thickness.

9. A multi-cylinder piston pump according to claim 1, wherein the shape of the area of contact of the pressure channel corresponds to the shape of the outer side of the pivot body.

10. A multi-cylinder piston pump according to claim 1, wherein flanges are formed on the ends of the pivot body facing the filling chamber end walls, the flanges partially covering the area of one inlet opening and entirely covering the area of the other inlet opening and the outlet opening.

* * * * *